US010840644B1

(12) United States Patent
Christenson et al.

(10) Patent No.: US 10,840,644 B1
(45) Date of Patent: Nov. 17, 2020

(54) PARALLEL PLUGGED CIRCUIT CARD REMOVAL

(71) Applicant: International Business Machines Corporation, Armonk, NY (US)

(72) Inventors: Brandon R. Christenson, Kasson, MN (US); Scott A. Shurson, Mantorville, MN (US); Eric A. Eckberg, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/589,952

(22) Filed: Oct. 1, 2019

(51) Int. Cl.
*H01R 13/635* (2006.01)
*H01R 43/26* (2006.01)
*H01R 12/71* (2011.01)

(52) U.S. Cl.
CPC ......... *H01R 13/635* (2013.01); *H01R 12/716* (2013.01); *H01R 43/26* (2013.01)

(58) Field of Classification Search
CPC ........................ H01R 13/62933–62972; H01R 13/62983–62994; H01R 13/635; H01R 12/716; H01R 43/26
USPC ........................................ 439/160, 157, 159
See application file for complete search history.

(56) References Cited

U.S. PATENT DOCUMENTS

| | | | | |
|---|---|---|---|---|
| 4,961,256 A | * | 10/1990 | Faillace | H01R 43/26 29/267 |
| 7,083,447 B2 | * | 8/2006 | Greiser | H05K 7/1409 439/152 |
| 7,762,831 B2 | * | 7/2010 | Lin | H01R 13/6395 439/157 |
| 8,007,299 B2 | * | 8/2011 | Murakami | H05K 7/1007 439/157 |
| 8,366,464 B1 | * | 2/2013 | Figuerado | G06F 1/185 439/160 |
| 9,122,458 B2 | | 9/2015 | Yu | |
| 9,509,073 B2 | * | 11/2016 | Hsu | H01R 12/7076 |
| 9,685,721 B2 | * | 6/2017 | Hsu | H01R 12/7076 |
| 9,942,999 B2 | * | 4/2018 | Hsu | H01L 23/40 |
| 10,194,550 B2 | * | 1/2019 | Fietz | H01R 12/7005 |
| 2009/0017658 A1 | * | 1/2009 | Liao | H05K 7/1084 439/160 |
| 2009/0035979 A1 | | 2/2009 | Kerrigan et al. | |

FOREIGN PATENT DOCUMENTS

EP          700132 A1     3/1996

* cited by examiner

*Primary Examiner* — Gary F Paumen
(74) *Attorney, Agent, or Firm* — Nathan M. Rau

(57) ABSTRACT

Apparatuses, methods, and systems directed to a circuit board assembly configured for parallel plugged card removal are disclosed. A circuit board assembly includes a main circuit board configured to dock an expansion card in a parallel arrangement, at least two circuit board connectors disposed on a surface of the main circuit board and operable to receive respective plug connectors of the expansion card, and a pivoting assembly comprising a plurality of lever arms, the pivoting assembly being coupled to main circuit board such that a first circuit board connector is disposed between a first pair of lever arms and a second circuit board connector is disposed between a second pair of lever arms, wherein a force applied to the pivoting assembly in direction approaching the main circuit board is translated to a force applied by each lever arm in direction away from the main circuit board.

20 Claims, 8 Drawing Sheets provide a circuit board assembly comprising a main circuit board configured to dock an expansion card in a parallel arrangement, at least two circuit board connectors disposed on a surface of the main circuit board and operable to receive respective plug connectors of the expansion card, and a pivoting assembly comprising a plurality of lever arms, the pivoting assembly being coupled to main circuit board such that a first circuit board connector is disposed between a first pair of lever arms and a second circuit board connector is disposed between a second pair of lever arms

810 apply a force to the pivoting assembly in direction approaching the main circuit board such that the force applied to the pivoting assembly is translated to a force applied by each lever arm in direction away from the main circuit board operable to remove a docked expansion card

820

FIG. 8 provide a circuit board assembly comprising a main circuit board configured to dock an expansion card in a parallel arrangement, at least two circuit board connectors disposed on a surface of the main circuit board and operable to receive respective plug connectors of the expansion card, and a pivoting assembly comprising a plurality of lever arms, the pivoting assembly being coupled to main circuit board such that a first circuit board connector is disposed between a first pair of lever arms and a second circuit board connector is disposed between a second pair of lever arms
810 dock the expansion card in the main circuit board
910 apply a force to the pivoting assembly in direction approaching the main circuit board such that the force applied to the pivoting assembly is translated to a force applied by each lever arm in direction away from the main circuit board operable to remove a docked expansion card
820 push, by each lever arm, on the expansion card to disengage the respective plug connectors of the expansion card from each of the first circuit board connector and the second circuit board connector
920 remove the expansion card from the main circuit board
930

FIG. 9

PARALLEL PLUGGED CIRCUIT CARD REMOVAL

BACKGROUND

Field of the Invention

The field of the invention is data processing assemblies, or, more specifically, methods, apparatus, and systems for parallel plugged circuit card removal.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Many computer systems include connection mechanisms that allow components of the system to be removed and replaced with other compatible components. Some components are in the form of modules, circuit boards, or cards which are plugged into connectors, slots, or sockets on a printed circuit board (PCB) of the computer system. For example, a computer system may include a main PCB, sometimes referred to as a motherboard or mother card, which is attached to the chassis or other component of the computer system. An extension component that interfaces with the mother card may be an auxiliary PCB, sometimes referred to as a daughter card. One common configuration of a daughter card that interfaces with the mother card is a perpendicular configuration, in which the daughter card has connector at one end that inserts into a receptacle of the mother card so that the daughter card extends perpendicular from the motherboard. While the perpendicular configuration allows the edges of the daughter card to be grasped and pulled for removal of the card from the mother card, this configuration necessitates a relatively larger chassis to accommodate the height of the perpendicular card.

In some configurations, particularly as computer systems become increasingly compact, it may be difficult to safely undock the removable component from the main board without damaging the component or the docking connectors of the main board. For example, the inability to access the card may necessitate special tools. Moreover, the uneven application of force in removing the component may result in damage.

SUMMARY

An embodiment in accordance with the present invention is directed to a circuit board assembly configured for parallel plugged card removal, comprising a main circuit board configured to dock an expansion card in a parallel arrangement, at least two circuit board connectors disposed on a surface of the main circuit board and operable to receive respective plug connectors of the expansion card, and a pivoting assembly comprising a plurality of lever arms, the pivoting assembly being coupled to main circuit board such that a first circuit board connector is disposed between a first pair of lever arms and a second circuit board connector is disposed between a second pair of lever arms, wherein a force applied to the pivoting assembly in direction approaching the main circuit board is translated to a force applied by each lever arm in direction away from the main circuit board.

Another embodiment in accordance with the present invention is directed to a computer system configured for parallel plugged card removal, comprising a chassis, a main circuit board fixed to the chassis and comprising at least two circuit board connectors disposed on a surface of the main circuit board, an expansion card configured to dock with main circuit board in a parallel alignment, the expansion card comprising at least two plug connectors disposed on a surface of the expansion card facing said surface of the main circuit board, wherein the at least two plug connectors are operable to connect respectively to the at least two circuit board connectors and a pivoting assembly comprising a plurality of lever arms, the pivoting assembly being coupled to main circuit board such that a first circuit board connector is disposed between a first pair of lever arms and a second circuit board connector is disposed between a second pair of lever arms, wherein a force applied to the pivoting assembly in direction approaching the main circuit board is translated to a force applied by each lever arm in direction away from the main circuit board.

Yet another embodiment in accordance with the present invention is directed to a method of parallel plugged card removal comprising providing a circuit board assembly comprising a main circuit board configured to dock an expansion card in a parallel arrangement, at least two circuit board connectors disposed on a surface of the main circuit board and operable to receive respective plug connectors of the expansion card; and a pivoting assembly comprising a plurality of lever arms, the pivoting assembly being coupled to main circuit board such that a first circuit board connector is disposed between a first pair of lever arms and a second circuit board connector is disposed between a second pair of lever arms, and applying a force to the pivoting assembly in direction approaching the main circuit board such that the force applied to the pivoting assembly is translated to a force applied by each lever arm in direction away from the main circuit board to remove a docked expansion card.

In the various embodiments, when the expansion card is docked in the main circuit board, the force applied to the pivoting assembly is translated to the force applied by each lever arm such that each lever arm pushes on the expansion card to disengage the respective plug connectors of the expansion card from each of the first circuit board connector and the second circuit board connector.

In various embodiments, the pivoting assembly further comprises a primary pivoting member comprising a first lever arm and a second lever arm, wherein the first lever arm and the second lever arm of the primary pivoting member are each supported by a respective bracket coupled to the main circuit board, and wherein the first receptacle connector disposed between the first lever arm and the second lever arm, a secondary pivoting member actuated by the primary pivoting member, the secondary pivoting member comprising a third lever arm and a fourth lever arm, wherein the third lever arm and the fourth lever arm of the secondary pivoting member are each supported by a respective bracket coupled to the main circuit board, and wherein the second receptacle connector disposed on a surface of the main circuit board between the first arm and the second arm of the secondary pivoting member, and a respective pushing member disposed proximate a free end of each of the plurality of lever arms, wherein the force applied to the pivoting assembly is translated to a force applied by each respective pushing member in direction away from the main circuit board. The primary pivoting member may further comprise an actuator portion, and wherein, when the expansion card is docked in the main circuit board, the actuator portion extends from beneath the expansion card such that the actuator portion is accessible.

In various embodiments, the force applied to the pivoting assembly may be applied manually to the actuator portion to separate the expansion card from the main circuit board. Further, each respective pushing member pushes on a surface of a circuit board of a docked expansion card during extraction of the docked expansion card by applying the force to the pivoting assembly. Still further, when the force provided by each lever arm is substantially parallel in direction and substantially perpendicular to the main circuit board. The pivoting assembly may be disposed on a surface of the main circuit board such that, when the expansion card is docked on the main circuit board, the pivoting assembly is situated between a surface of the expansion card and the surface of the main circuit board.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 8 illustrates a method of parallel plugged circuit card removal according to embodiments of the present invention; and FIG. 9 illustrates a method of parallel plugged circuit card removal according to embodiments of the present invention.

DETAILED DESCRIPTION

Figure 1:
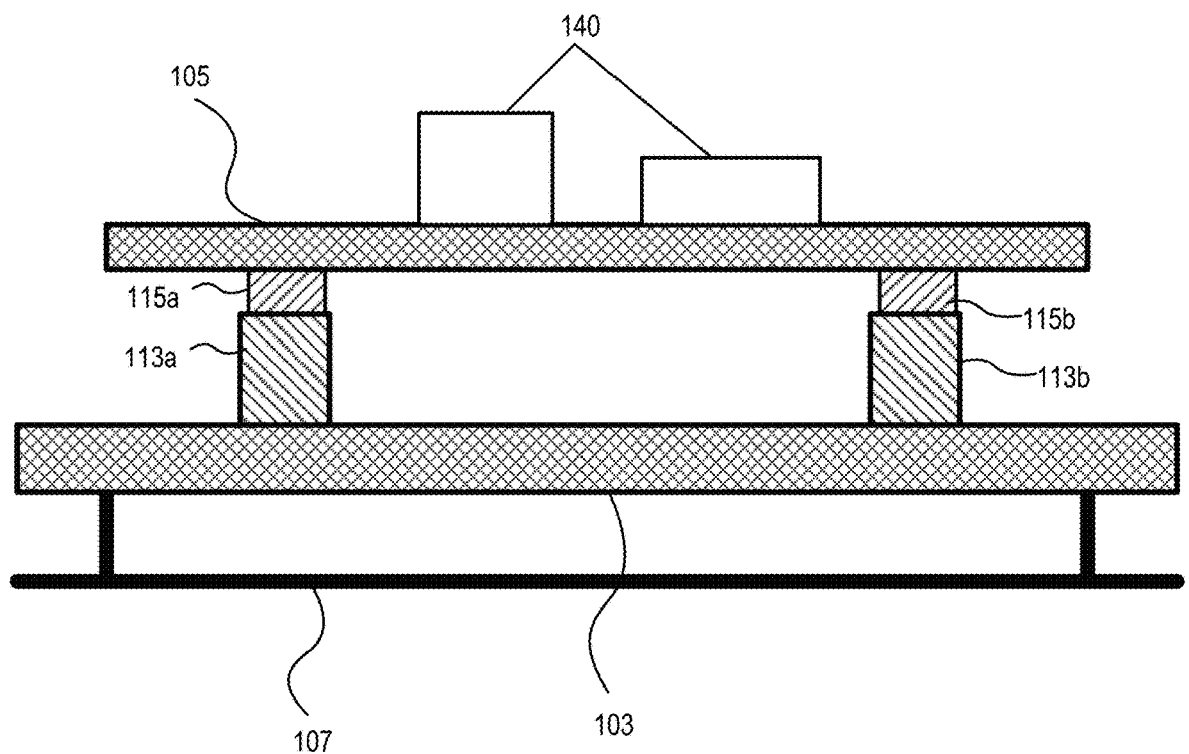
FIG. 1 illustrates a system configurable for parallel plugged circuit card removal according to embodiments of the present invention.

Exemplary methods, apparatus, and products for parallel plugged circuit card removal in accordance with the present invention are described with reference to the accompanying drawings, beginning with FIG. 1. FIG. 1 sets forth system (101) configurable for parallel plugged circuit card removal according to embodiments of the present invention. The system (101) of FIG. 1 includes a main circuit board (103), which may be a printed circuit board (PCB) and which may also be referred to as a mother card, that supports modular components such as a expansion card (105), which may also be a PCB and which may also be referred to as daughter card, that are removably docked on the main circuit board (103). In some embodiments, the main circuit board (103) may be attached to a chassis (107) or otherwise fixed. The main circuit board (103) includes circuit board connectors (113a, 113b) for receiving the modular components such as the expansion card (105).

The expansion card (105) and mother card (103) may include additional computer components (140), such as a graphics controller, memory, a co-processor, a power supply, storage media, or any other computer component suitable for placement on the expansion card (105). The expansion card (105) interfaces with the main circuit board (103) via expansion card connectors (115a, 115b), which are formed and sized to mate with the connectors (113a, 113b) on the main circuit board (103). The connectors (115a, 115b) include a plurality of signal contacts that are used to mate with corresponding signal contacts in the connectors (113a, 113b).

FIG. 1 illustrates the main circuit board (103) in a parallel plugged configuration with the expansion card (105). For example, the connectors (115a, 115b) disposed on the bottom surface (117) of the expansion card (105) align with the connectors (113a, 113b) disposed on the opposing top surface (119) of the main circuit board (103) such that, when connectors (115a, 115b) are plugged into connectors (113a, 113b), the expansion card (105) and the main circuit board (103) are aligned in parallel. This parallel configuration can reduce the space consumed by the system (101), which is advantageous in reducing the size of the form factor of a computer system containing the system (101).

While the parallel configuration of the expansion card (105) relative to the main circuit board (103) shown in FIG. 1 is compact, this configuration also reduces the amount of space typically available around the expansion card that may be used in undocking the expansion card from the main circuit board. Other components coupled to the main circuit board near the expansion card may make grasping the PCB edges difficult. Since the connectors (115a, 115b) of the expansion card (105) are not typically visible when coupled to the main circuit board (103), pulling on the expansion card (105) can create an unequal force or angled application of force that damages the main circuit board connectors (113a, 113b), the expansion card connectors (115a, 115b), or other components and wiring of the expansion card (105). Thus, the restricted space around the expansion card (105) may require special tools for undocking the expansion card (105) from the main circuit board (103) without damage to either component.

The act of unplugging the expansion card (105) from the main circuit board (103) must spread the force evenly over all of the docking connectors (115a, 115b) and connectors (113a, 113b) such that the connectors do not bind and such that the cards are not "peeled" away from one another at an angle or damaged in any way. One solution may utilize set screws (not shown) in a specified torqueing/un-torqueing sequence to overcome the unplug forces and undock the cards. A drawback of such a solution is the necessity of external tool to complete the undock procedure and the fact that the process of individually torqueing any undocking screws is not uniform in the load placed on the connectors, increasing the risks of binding and damage to both cards, their connectors, and other components.

In order to avoid damage to the cards during extraction of a expansion card from a main circuit board, embodiments of the present invention utilize a pivoting assembly, as described below with reference to FIG. 3, to multiply a user's input force onto evenly distributed pushing members to separate mated cards. A user's hands/fingers activate the pivoting assembly, causing lever arms to rotate about a fulcrum and create movement in the opposing direction such that the pushing members engage and apply force to the bottom surface of the expansion card, allowing the expansion card to be undocked from the main circuit board. The pivoting assembly is attached to the main circuit board in the mounting assembly. With the pivoting assembly in place, the expansion card may be installed, for example, via hand plugging until, such that the expansion card connectors are fully seated in the main circuit board connectors. During expansion card removal, a user actuates the pivoting assembly to separate the expansion card from the main circuit board.

Parallel plugged circuit card removal in accordance with the present invention is generally implemented in computers, that is, in automated computing machinery. For further explanation, therefore, FIG. 2 sets forth a block diagram of automated computing machinery comprising an exemplary computer (152) configured for parallel plugged circuit card removal according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an operating system (154). Operating systems may include, for example, UNIX™, Linux™, Microsoft XP™ AIX™ IBM's i5/OS™, and others as will occur to those of skill in the art. The operating system (154) is typically are stored in non-volatile memory also, such as, for example, on a disk drive (170).

Figure 2:
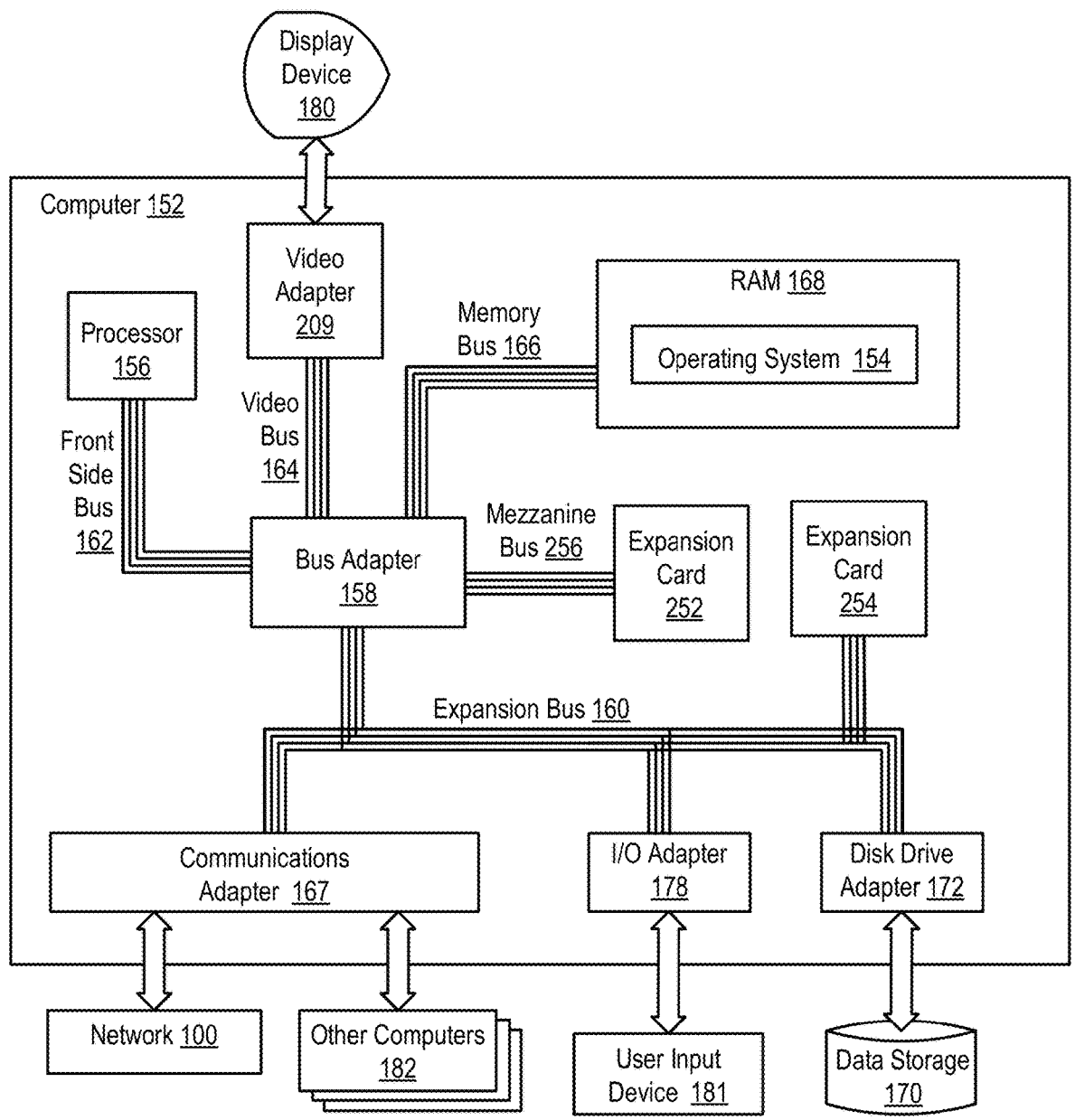
FIG. 2 illustrates an exemplary computer system according to embodiments of the present invention.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for parallel plugged circuit card removal according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications, and 802.11 adapters for wireless data communications.

The example computer (152) of FIG. 2 includes a expansion card (252), which is an example of an expansion card adapted to provide additional processing elements to the computer (152). The expansion card (252) is connected to processor (156) through a high speed mezzanine bus (256), bus adapter (158), and the front side bus (162), which is also a high speed bus. A expansion card (254) may also communicate via the expansion bus (160), for example, through a peripheral component interconnect (PCI) interface. To that end, the computer (152) of FIG. 2 also includes the expansion card (254) coupled through expansion bus (160) and bus adapter (158) to processor (156). The expansion card (254), like the expansion card (252), is an example of an expansion card adapted to provide additional processing elements to the computer (152).

Figure 3:
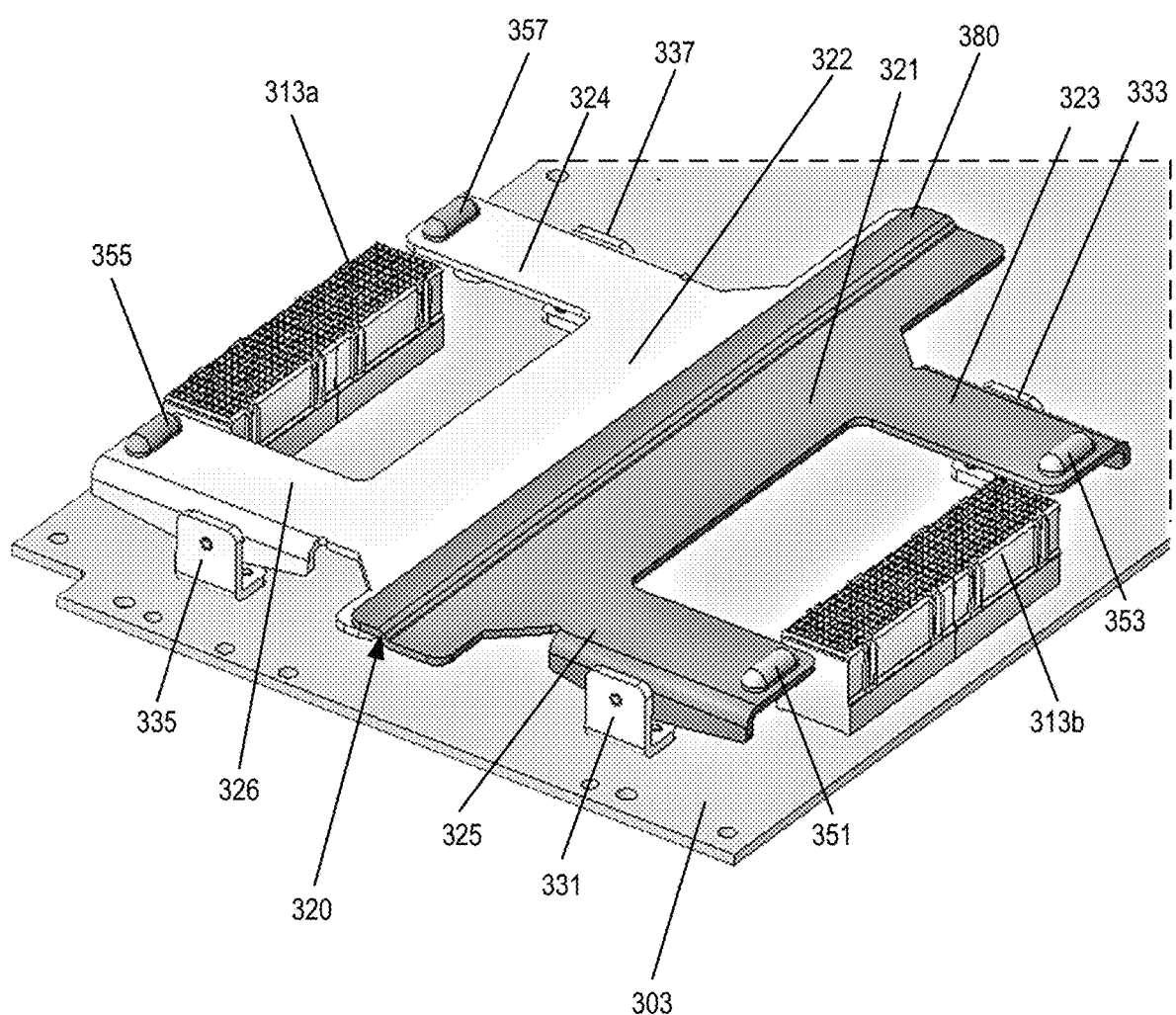
FIG. 3 illustrates a perspective view of a main circuit board assembly with a parallel plugged card removal mechanism according to embodiments of the present invention.

FIG. 3 sets forth a perspective diagram illustrating an exemplary circuit board assembly (301) configured for parallel plugged circuit card removal according to embodiments of the present invention that includes a main circuit board (303), referred to also as a mother card or motherboard, circuit board connectors (313a, 313b) disposed on the surface of the main circuit board (303), and pivoting assembly (320) coupled to the surface of the main circuit board (303). The main circuit board (303) may include various processing components, trace wiring, via holes, and other circuit board components as recognized by those of skill in the art. The circuit board connectors (313a, 313b) are configured to interfaces with various processing components, trace wiring, via holes, and other circuit board components. Further, the circuit board connectors (313a, 313b) are configured to receive corresponding plug connectors of a compatible expansion card, referred to also as a daughter card, daughterboard, or mezzanine card.

The pivoting assembly (320) shown in FIG. 3 includes a primary pivoting member (321) that has a pair of lever arms (323, 325) extending in the direction of circuit bard connector (313b), such that circuit board connector (313b) is disposed between the lever arms (323, 325). Lever arm (323) is coupled to the main circuit board (303) by bracket (333) and lever arm (325) is coupled to the main circuit board (303) by bracket (331), such that brackets (333, 331) provide a fulcrum about which the primary pivoting member (321) pivots. Each lever arm (323, 325) respectively includes a pushing member (353, 351) that provides a contact area between the lever arms (323, 325) and an expansion card (shown in FIG. 4) during removal of the expansion card. To that end, pushing members (353, 351) may be formed of rubber or silicone.

The pivoting assembly (320) shown in FIG. 3 further includes a secondary pivoting member (322) that has a pair of lever arms (324, 326) extending in the direction of circuit bard connector (313a), such that circuit board connector (313a) is disposed between the lever arms (324, 326). Lever arm (324) is coupled to the main circuit board (301) by bracket (337) and lever arm (326) is coupled to the main circuit board (303) by bracket (335), such that brackets (337, 335) provide a fulcrum about which the secondary pivoting member (322) pivots. Each lever arm (324, 326) respectively includes a pushing member (357, 355) that provides a contact area between the lever arms (324, 326) and an expansion card (shown in FIG. 4) during removal of the expansion card. To that end, pushing members (357, 355) may be formed of raised pads of rubber or silicone.

In an embodiment in accordance with the present invention, the primary pivoting member (321), secondary pivoting member (322), and brackets (331, 333, 335, 337) together form a pivoting assembly (320) useful in parallel plugged circuit card removal. A downward force applied to an actuator portion (380) of pivoting assembly (320) causes lever arms (323, 324, 325, 326) to push upwards and away from main circuit board (303), using brackets (331, 333, 335, 337) as leverage, such that an expansion card docked in circuit board connectors (313a, 313b) will be pushed upwards and unmated by the force applied by the pushing members (351, 353, 355, 357) to the bottom surface of the expansion card, as will be illustrated in the following figures.

Figure 4:
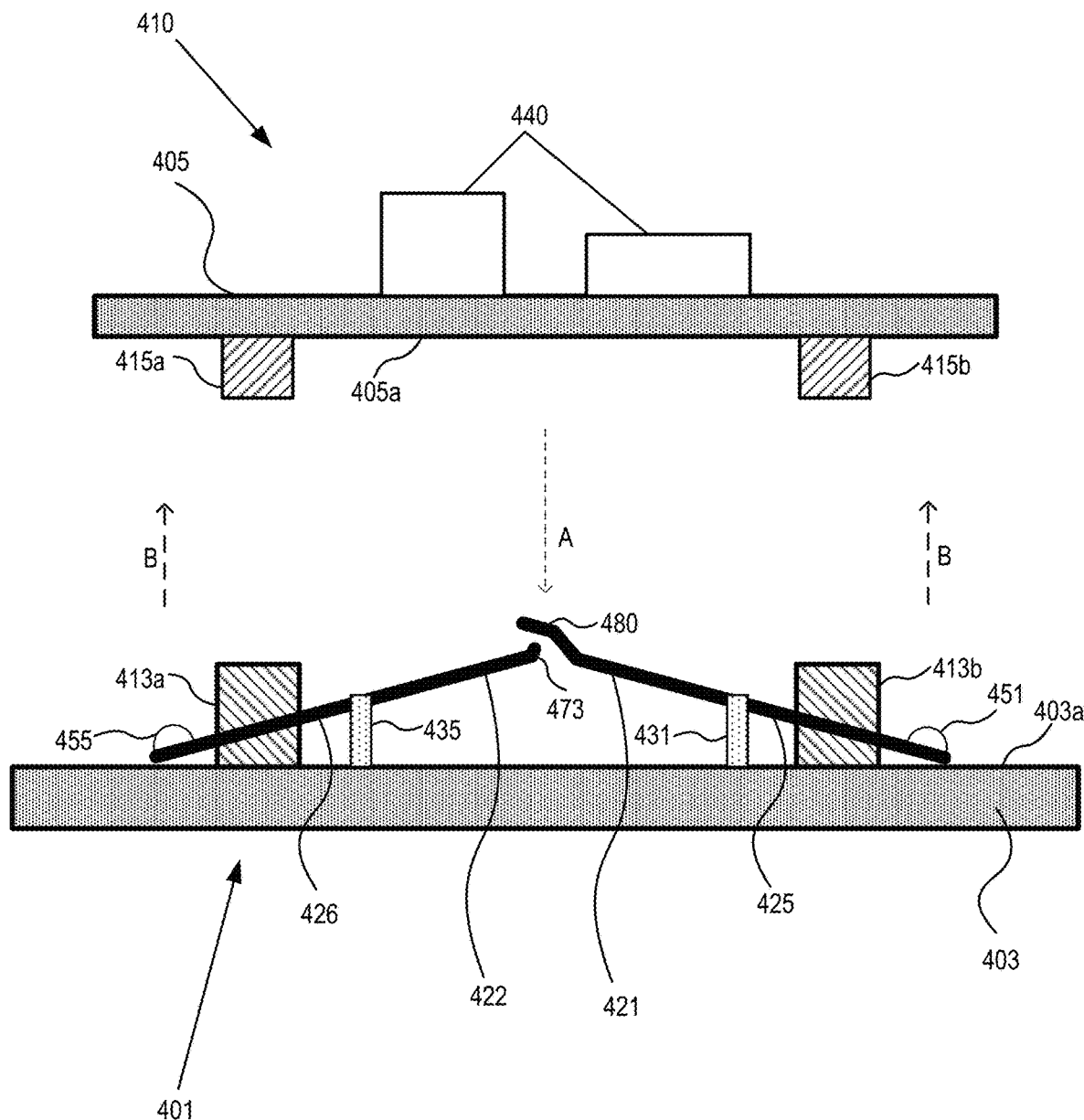
FIG. 4 illustrates a first cross-section view of a main circuit board assembly with a parallel plugged card removal mechanism according to embodiments of the present invention.

FIG. 4 sets forth a cross-sectional diagram illustrating an exemplary system configured for parallel plugged circuit card removal according to embodiments of the present invention that includes a circuit board assembly (401) configured to dock an expansion card assembly (410) in a parallel arrangement, such that, when the expansion card assembly (410) is docked in the circuit board assembly (401), a bottom surface (405a) of the expansion card assembly (410) is parallel to a top surface (403a) of the circuit board assembly (401). FIG. 4 illustrates the circuit board assembly (401) prior to docking the expansion card assembly (410). In accordance with embodiments of the present invention, the circuit board assembly (401) illustrated in FIG. 4 is a cross-section of the circuit board assembly (301) shown in a perspective view in FIG. 3.

The circuit board assembly (401) shown in FIG. 4 includes a pivoting assembly (431, 435, 421, 425, 451, 422, 426, 455) such as the pivoting assembly (320) described above with reference to FIG. 3. In the cross-sectional view of FIG. 4, brackets (431, 435), a primary pivoting member (421) including a lever arm (425) and a pushing member (451), and a secondary pivoting member (422) including a lever arm (426) and pushing member (455) form, in part, a pivoting assembly coupled to a main circuit board (403). The circuit board assembly (401) further includes circuit board connectors (413a, 413b) disposed on the surface (403a) of the main circuit board (403) and interfaced with electrical wiring (not shown) of the main circuit board (403). The circuit board connector (413b) is disposed between the lever arm (425) and a second lever arm (not shown) of the primary pivoting member (421), and circuit board connector (413a) is disposed between the lever arm (426) and a second lever arm (not shown) of the secondary pivoting member (422).

The expansion card assembly (410) shown in FIG. 4 includes an expansion card circuit board (405) and expansion card connectors (415a, 415b) disposed on a surface (405a) of expansion card circuit board (405). The expansion card connectors (415a, 415b) are configured to mate and interface with circuit board connectors (413a, 413b) when the expansion card assembly (410) is docked in circuit board assembly (401). The expansion card assembly (410) further includes additional processing components (440) that provide an expansion of functionality to circuit board assembly (401) through the interface of expansion card connectors (415a, 415b) with the circuit board connectors (413a, 413b).

In the circuit board assembly (401) shown in FIG. 4, lever arm (425) is coupled to the main circuit board (403) by bracket (431) and lever arm (426) is coupled to the main circuit board (403) by bracket (435), such that brackets (431, 435) respectively provide a fulcrum about which the primary pivoting member (421) and the secondary pivoting member (422) pivot. The primary pivoting member (421) includes an actuator portion (480) that engages the secondary pivoting member (422) when a downward force in direction A (toward the main circuit board (403)) is applied to the actuator portion (480). The primary pivoting member (422) further includes a lip (473) that assists engagement of the secondary pivoting member (422) by the actuator portion (480) of the primary pivoting member (421).

In operation of the pivoting assembly (431, 435, 421, 425, 451, 422, 426, 455) to remove a parallel plugged expansion card in accordance with embodiments of the present invention, FIG. 4 illustrates that a downward force in direction A applied to the actuator portion (480) causes the actuator portion (480) of primary pivoting member (421) and the lip (473) of secondary pivoting member (422) to approach the surface (403a) of the main circuit board (403), which causes the lever arms (425, 426) to pivot and push away from main circuit board (403) with an upward force in direction B using the brackets (431, 435) as leverage. The pivoting of the lever arms (425, 426) causes the pushing members (451, 455) to engage the bottom surface (405a) of the expansion card circuit board (405). The expansion card assembly (410) docked on the circuit board assembly (401) is, during removal of the parallel plugged expansion card assembly, pushed upwards causing circuit board connectors (413a, 413b) and expansion card connectors (415a, 415b) to disengage through the force applied by the pushing members (451, 455) to the bottom surface (405a) of the expansion card circuit board (405), as will be illustrated in the following figures.

Figure 5:
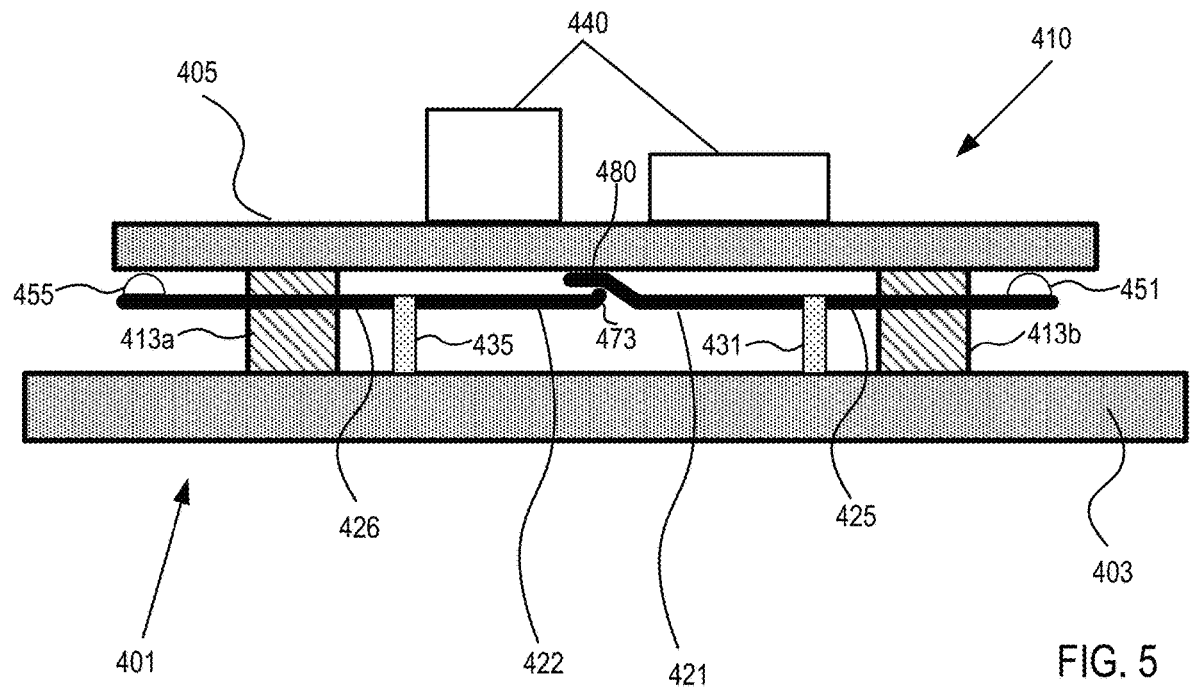
FIG. 5 illustrates a second cross-section view of a main circuit board assembly with a parallel plugged card removal mechanism according to embodiments of the present invention.

FIG. 5 sets forth a cross-sectional diagram illustrating an exemplary system configured for parallel plugged circuit card removal according to embodiments of the present invention that includes a circuit board assembly (401) of FIG. 4 with the expansion card assembly (410) of FIG. 4 docked in a parallel arrangement, such that the bottom surface (405a) of the expansion card circuit board (405) is parallel to the top surface (403a) of the main circuit board (403). In FIG. 5, like numerical identifiers represent like elements with respect to FIG. 4.

The circuit board assembly (401) shown in FIG. 5, like FIG. 4, includes a pivoting assembly (431, 435, 421, 425, 451, 422, 426, 455) such as the pivoting assembly (320) described above with reference to FIG. 3. In the cross-sectional view of FIG. 5, brackets (431, 435), a primary pivoting member (421) including a lever arm (425) and a pushing member (451), and a secondary pivoting member (422) including a lever arm (426) and pushing member (455) form, in part, a pivoting assembly coupled to a main circuit board (403). The circuit board assembly (401) further includes circuit board connectors (413a, 413b) disposed on the surface (403a) of the main circuit board (403) and interfaced with electrical wiring (not shown) of the main circuit board (403). The circuit boar connector (413b) is disposed between the lever arm (425) and a second lever arm (not shown) of the primary pivoting member (421), and circuit boar connector (413a) is disposed between the lever arm (426) and a second lever arm (not shown) of the secondary pivoting member (422).

The expansion card assembly (410) shown in FIG. 5, like FIG. 4, includes an expansion card circuit board (405) and expansion card connectors (415a, 415b) disposed on a surface (405a) of expansion card circuit board (405). However, in the view shown in FIG. 5, the expansion card connectors (415a, 415b) are mated with circuit board connectors (413a, 413b) and thus are not shown because the expansion card assembly (410) is docked in circuit board assembly (401). The expansion card assembly (410) further includes additional processing components (440) that provide an expansion of functionality to circuit board assembly (401) through the interface of expansion card connectors (415a, 415b) with the circuit board connectors (413a, 413b).

As shown in FIG. 5, when the expansion card assembly (410) is plugged into the circuit board assembly (401), the pivoting assembly (431, 435, 421, 425, 451, 422, 426, 455) is placed into a "ready" configuration for plugged expansion card removal. That is, the bottom surface (405a) of expansion card circuit board (405) applies a trivial force to the actuator portion (480) of the primary pivoting member (425), causing the lever arms (425, 426) to pivot and raise the pushing members (451, 455) to a configuration in which pushing members (451, 455) are ready to engage the bottom surface (405a) of the expansion card circuit board (405). It will be recognized by those of skill in the art that other "ready" configurations may be used without diverging from the spirit of the present invention by changing the location of the fulcrum point provided by brackets (431, 435) and/or the length of the lever arms (425, 426).

Figure 6:
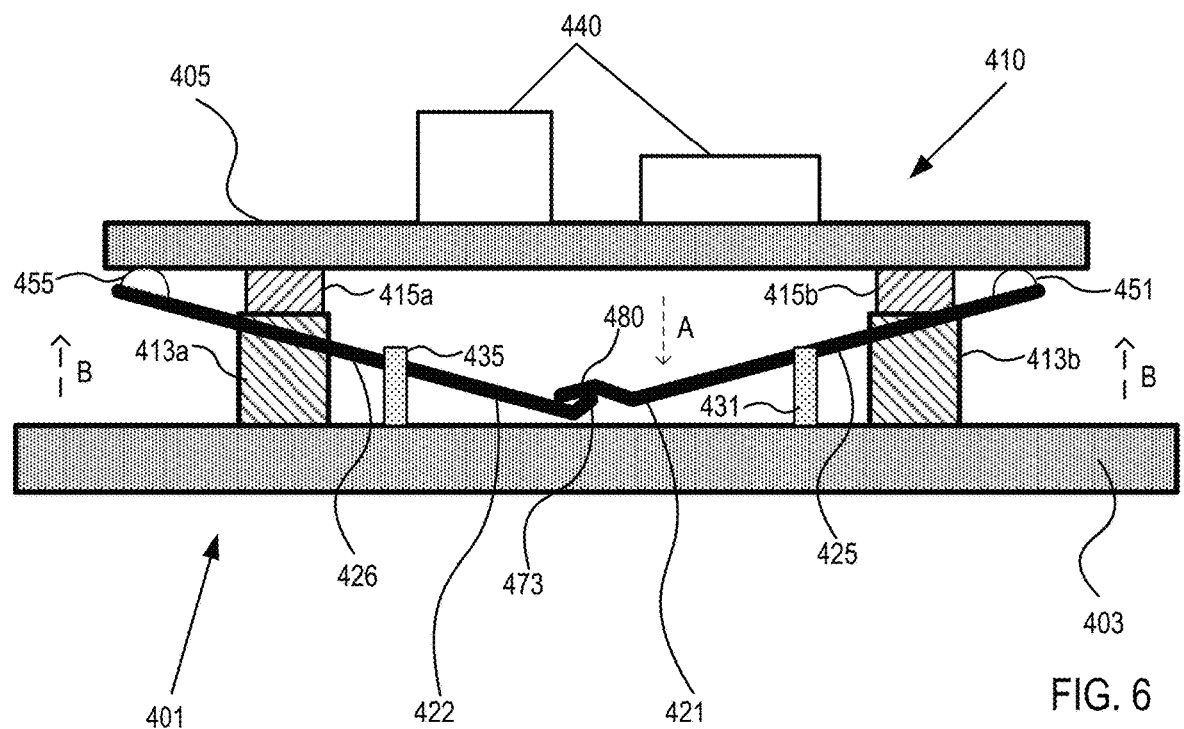
FIG. 6 illustrates a third cross-section view of a main circuit board assembly with a parallel plugged card removal mechanism according to embodiments of the present invention.

FIG. 6 sets forth a cross-sectional diagram illustrating an exemplary system configured for parallel plugged circuit card removal according to embodiments of the present invention that includes a circuit board assembly (401) of FIG. 4 during removal of the expansion card assembly (410) of FIG. 4 from a docked parallel arrangement. In FIG. 6, like numerical identifiers represent like elements with respect to FIGS. 4 and 5.

The circuit board assembly (401) shown in FIG. 6, like FIG. 4, includes a pivoting assembly (431, 435, 421, 425, 451, 422, 426, 455) such as the pivoting assembly (320) described above with reference to FIG. 3. In the cross-sectional view of FIG. 5, brackets (431, 435), a primary pivoting member (421) including a lever arm (425) and a pushing member (451), and a secondary pivoting member (422) including a lever arm (426) and pushing member (455) form, in part, a pivoting assembly coupled to a main circuit board (403). The circuit board assembly (401) further includes circuit board connectors (413a, 413b) disposed on the surface (403a) of the main circuit board (403) and interfaced with electrical wiring (not shown) of the main circuit board (403). The circuit boar connector (413b) is disposed between the lever arm (425) and a second lever arm (not shown) of the primary pivoting member (421), and circuit boar connector (413a) is disposed between the lever arm (426) and a second lever arm (not shown) of the secondary pivoting member (422).

The expansion card assembly (410) shown in FIG. 6, like FIG. 4, includes an expansion card circuit board (405) and expansion card connectors (415a, 415b) disposed on a surface (405a) of expansion card circuit board (405). However, in the view shown in FIG. 5, the expansion card connectors (415a, 415b) are mated with circuit board connectors (413a, 413b) and thus are not shown because the expansion card assembly (410) is docked in circuit board assembly (401). The expansion card assembly (410) further includes additional processing components (440) that provide an expansion of functionality to circuit board assembly (401) through the interface of expansion card connectors (415a, 415b) with the circuit board connectors (413a, 413b).

In operation of the pivoting assembly (431, 435, 421, 425, 451, 422, 426, 455) to remove a parallel plugged expansion card in accordance with embodiments of the present invention, FIG. 6 illustrates that a downward force that has been applied in direction A to the actuator portion (480) has caused the actuator portion (480) of primary pivoting member (421) and the lip (473) of secondary pivoting member (422) to approach the surface (403a) of the main circuit board (403), which has caused the lever arms (425, 426) to pivot and push away from main circuit board (403) with an upward force in direction B using the brackets (431, 435) as leverage. The pivoting of the lever arms (425, 426) has caused the pushing members (451, 455) to engage the bottom surface (405a) of the expansion card circuit board (405). The expansion card assembly (410) docked on the circuit board assembly (401) has been pushed upwards causing circuit board connectors (413a, 413b) and expansion card connectors (415a, 415b) to disengage through the force applied by the pushing members (451, 455) to the bottom surface (405a) of the expansion card circuit board (405). That is, operation of the operation of the pivoting assembly (431, 435, 421, 425, 451, 422, 426, 455) causes the expansion card assembly (410) to be ejected from the circuit board assembly (401) by an application of force to the actuator portion (480) that is distributed to pushing members (451, 455) such that pushing members (451, 455) each apply substantially equal and substantially parallel force in a direction inverse to the direction of force applied to the actuator portion (480).

Figure 7:
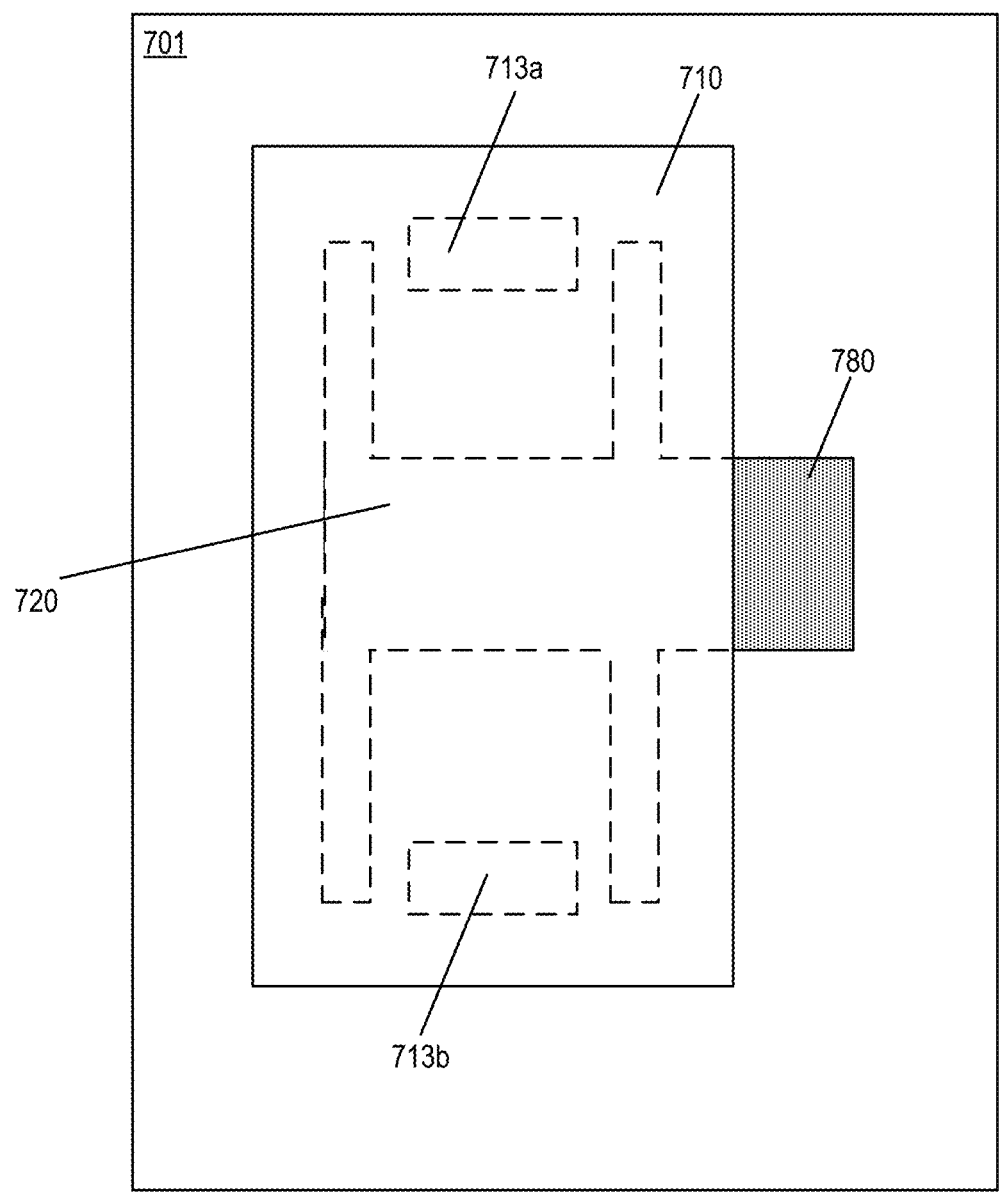
FIG. 7 illustrates a plan view of a main circuit board assembly with a parallel plugged card removal mechanism according to embodiments of the present invention.

FIG. 7 sets forth a plan view diagram illustrating an exemplary system configured for parallel plugged circuit card removal according to embodiments of the present invention that includes a circuit board assembly (701) with an expansion card assembly (710) docked in a parallel arrangement. The pivoting assembly (720) and circuit board connectors (713a, 713b) are disposed on the circuit board assembly (701) beneath the expansion card assembly (710). An actuator portion (780) of pivoting assembly (720) extends from beneath the expansion card assembly (710) such that the actuator portion (780) is accessible to a user and such that a user may press down on the actuator portion (780) to eject the expansion card assembly (710) from the circuit board assembly (701).

For further explanation, FIG. 8 sets forth a flow chart illustrating an exemplary method for parallel plugged circuit card removal according to embodiments of the present invention that includes providing (810) a circuit board assembly comprising a main circuit board configured to dock an expansion card in a parallel arrangement, at least two circuit board connectors disposed on a surface of the main circuit board and operable to receive respective plug connectors of the expansion card, and a pivoting assembly comprising a plurality of lever arms, the pivoting assembly being coupled to main circuit board such that a first circuit board connector is disposed between a first pair of lever arms and a second circuit board connector is disposed between a second pair of lever arms, and applying (820) a force to the pivoting assembly in direction approaching the main circuit board such that the force applied to the pivoting assembly is translated to a force applied by each lever arm in direction away from the main circuit board operable to remove a docked expansion card.

In the exemplary method of FIG. 8, providing (810) a circuit board assembly may be carried out by providing a circuit board assembly in accordance with the circuit board assembly (401) of FIG. 4. Applying (820) a force to the pivoting assembly in direction approaching the main circuit board such that the force applied to the pivoting assembly is translated to a force applied by each lever arm in direction away from the main circuit board operable to remove a docked expansion card may be carried out by, for example, applying a force to the actuator portion (480) of the pivoting assembly (431, 435, 421, 425, 451, 422, 426, 455) of FIG. 4 in direction A such that lever arms (425, 426) pivot causing pushing members (451, 455) push away from the main circuit board (403) of FIG. 4 in direct B.

For further explanation, FIG. 9 sets forth a flow chart illustrating an exemplary method for parallel plugged circuit card removal according to embodiments of the present invention. The method of FIG. 9 is similar to the method of FIG. 8 in that it also includes providing (810) a circuit board assembly comprising a main circuit board configured to dock an expansion card in a parallel arrangement, at least two circuit board connectors disposed on a surface of the main circuit board and operable to receive respective plug connectors of the expansion card, and a pivoting assembly comprising a plurality of lever arms, the pivoting assembly being coupled to main circuit board such that a first circuit board connector is disposed between a first pair of lever arms and a second circuit board connector is disposed between a second pair of lever arms, and applying (820) a force to the pivoting assembly in direction approaching the main circuit board such that the force applied to the pivoting assembly is translated to a force applied by each lever arm in direction away from the main circuit board operable to remove a docked expansion card.

The exemplary method of FIG. 9 is different from the method of FIG. 8 in that it further includes docking (910) the expansion card in the main circuit board. Docking (910) the expansion card in the main circuit board may be carried out, for example, by manually inserting the expansion card assembly (410) of FIG. 4 into the circuit board assembly (401) such that the expansion card connectors (415a, 415b) mate with the circuit board connectors (413a, 413b). FIG. 5 illustrates an exemplary result of docking (910) the expansion card assembly (410) in the circuit board assembly (401).

The exemplary method of FIG. 9 is also different from the method of FIG. 8 in that applying (820) a force to the pivoting assembly in direction approaching the main circuit board such that the force applied to the pivoting assembly is translated to a force applied by each lever arm in direction away from the main circuit board operable to remove a docked expansion card further includes pushing (920), by each lever arm, on the expansion card to disengage the respective plug connectors of the expansion card from each of the first circuit board connector and the second circuit board connector. Pushing (920), by each lever arm, on the expansion card to disengage the respective plug connectors of the expansion card from each of the first circuit board connector and the second circuit board connector may be carried out by manually pushing the actuator portion (480) of the pivoting assembly (431, 435, 421, 425, 451, 422, 426, 455) such that lever arms (425, 426) pivot upwards in direction B. Accordingly, the pushing members (451, 455) engage the bottom surface (405a) of expansion card circuit board (405) and push the expansion card assembly (410) away from the circuit board assembly (401), thus disengaging expansion card connectors (415a, 415b) from circuit board connectors (413a, 413b), as shown in FIG. 6.

The exemplary method of FIG. 9 is also different from the method of FIG. 8 in that it further includes removing (930) the expansion card. Removing (930) the expansion card may be carried out by manually pulling the ejected expansion card assembly (410) from the circuit board assembly (401) after actuation of the pivoting assembly (431, 435, 421, 425, 451, 422, 426, 455) to eject the expansion card assembly (410) expansion card connectors (415a, 415b) from the circuit board connectors (413a, 413b).

In view of the explanations set forth above, readers will recognize that the benefits of parallel plugged circuit card removal according to embodiments of the present invention include:

the card removal mechanism is entirely within the area between the expansion card and the main circuit board, creating self-sustained assembly without the need for additional external tools that a user may not have at hand;

the mechanical advantage of the lever action reduces the amount of force needed from the user to overcome the unplug resistance of the connectors, with the force being exerted in a pushing motion that is often easier to execute than pulling the expansion card away while maintaining a hold on the main circuit board (to prevent dislodging or damaging the main circuit board); and the equal application of force by the push elements on the arms of the primary and secondary lever ensure a parallel motion of the expansion card as it is undocked from the main circuit board, reducing the possibility of any connector binding or damage.

Exemplary embodiments of the present invention are described largely in the context of a fully functional computer system for parallel plugged circuit card removal. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A circuit board assembly configured for parallel plugged card removal, comprising:

a main circuit board configured to dock an expansion card in a parallel arrangement;

at least two circuit board connectors disposed on a surface of the main circuit board and operable to receive respective plug connectors of the expansion card; and a pivoting assembly comprising a plurality of lever arms, the pivoting assembly being coupled to the main circuit board such that a first circuit board connector is disposed between a first pair of lever arms and a second circuit board connector is disposed between a second pair of lever arms, wherein a force applied to the pivoting assembly in the direction approaching the main circuit board is translated to a force applied by each lever arm in the direction away from the main circuit board.

2. The circuit board assembly of claim 1, wherein, when the expansion card is docked in the main circuit board, the force applied to the pivoting assembly is translated to the force applied by each lever arm such that each lever arm pushes on the expansion card to disengage the respective plug connectors of the expansion card from each of the first circuit board connector and the second circuit board connector.

3. The circuit board assembly of claim 1, where in the pivoting assembly further comprises:

a primary pivoting member comprising a first lever arm and a second lever arm, wherein the first lever arm and the second lever arm of the primary pivoting member are each supported by a respective bracket coupled to the main circuit board, and wherein the first circuit board connector is disposed between the first lever arm and the second lever arm;

a secondary pivoting member actuated by the primary pivoting member, the secondary pivoting member comprising a third lever arm and a fourth lever arm, wherein the third lever arm and the fourth lever arm of the secondary pivoting member are each supported by a respective bracket coupled to the main circuit board, and wherein the second circuit board connector is disposed on a surface of the main circuit board between the first arm and the second arm of the secondary pivoting member; and a respective pushing member disposed proximate a free end of each of the plurality of lever arms, wherein the force applied to the pivoting assembly is translated to a force applied by each respective pushing member in direction away from the main circuit board.

4. The circuit board assembly of claim 3, wherein the primary pivoting member further comprises an actuator portion, and wherein, when the expansion card is docked in the main circuit board, the actuator portion extends from beneath the expansion card such that the actuator portion is accessible.

5. The circuit board assembly of claim 4, wherein the force applied to the pivoting assembly is applied manually to the actuator portion to separate the expansion card from the main circuit board.

6. The circuit board assembly of claim 3, wherein each respective pushing member pushes on a surface of a circuit board of a docked expansion card during extraction of the docked expansion card by applying the force to the pivoting assembly.

7. The circuit board assembly of claim 1, wherein the force provided by each lever arm is substantially parallel in direction and substantially perpendicular to the main circuit board.

8. The circuit board assembly of claim 1, wherein the pivoting assembly is disposed on a surface of the main circuit board such that, when the expansion card is docked on the main circuit board, the pivoting assembly is situated between a surface of the expansion card and the surface of the main circuit board.

9. A computer system configured for parallel plugged card removal, comprising:

a chassis;

a main circuit board fixed to the chassis and comprising at least two circuit board connectors disposed on a surface of the main circuit board;

an expansion card configured to dock with main circuit board in a parallel alignment, the expansion card comprising at least two plug connectors disposed on a surface of the expansion card facing said surface of the main circuit board, wherein the at least two plug connectors are operable to connect respectively to the at least two circuit board connectors; and a pivoting assembly comprising a plurality of lever arms, the pivoting assembly being coupled to the main circuit board such that a first circuit board connector is disposed between a first pair of lever arms and a second circuit board connector is disposed between a second pair of lever arms, wherein a force applied to the pivoting assembly in the direction approaching the main circuit board is translated to a force applied by each lever arm in the direction away from the main circuit board.

10. The computer system of claim 9, wherein, when the expansion card is docked in the main circuit board, the force applied to the pivoting assembly is translated to the force applied by each lever arm such that each lever arm pushes on the expansion card to disengage the respective plug connectors of the expansion card from each of the first circuit board connector and the second circuit board connector.

11. The computer system of claim 9, where in the pivoting assembly further comprises:

a primary pivoting member comprising a first lever arm and a second lever arm, wherein the first lever arm and the second lever arm of the primary pivoting member are each supported by a respective bracket coupled to the main circuit board, and wherein the first circuit board connector is disposed between the first lever arm and the second lever arm;

a secondary pivoting member actuated by the primary pivoting member, the secondary pivoting member comprising a third lever arm and a fourth lever arm, wherein the third lever arm and the fourth lever arm of the secondary pivoting member are each supported by a respective bracket coupled to the main circuit board, and wherein the second circuit board connector is disposed on a surface of the main circuit board between the first arm and the second arm of the secondary pivoting member; and a respective pushing member disposed proximate a free end of each of the plurality of lever arms, wherein the force applied to the pivoting assembly is translated to a force applied by each respective pushing member in direction away from the main circuit board.

12. The computer system of claim 11, wherein the primary pivoting member further comprises an actuator portion, and wherein, when the expansion card is docked in the main circuit board, the actuator portion extends from beneath the expansion card such that the actuator portion is accessible.

13. The computer system of claim 12, wherein the force applied to the pivoting assembly is applied manually to the actuator portion to separate the expansion card from the main circuit board.

14. The computer system of claim 11, wherein each respective pushing member pushes on a surface of a circuit board of a docked expansion card during extraction of the docked expansion card by applying the force to the pivoting assembly.

15. The computer system of claim 9, wherein the force provided by each lever arm is substantially parallel in direction and substantially perpendicular to the main circuit board.

16. The computer system of claim 9, wherein the pivoting assembly is disposed on a surface of the main circuit board such that, when the expansion card is docket on the main circuit board, the pivoting assembly is situated between a surface of the expansion card and the surface of the main circuit board.

17. A method of parallel plugged card removal, comprising:
   providing a circuit board assembly comprising:
      a main circuit board configured to dock an expansion card in a parallel arrangement;
      at least two circuit board connectors disposed on a surface of the main circuit board and operable to receive respective plug connectors of the expansion card; and
      a pivoting assembly comprising a plurality of lever arms, the pivoting assembly being coupled to the main circuit board such that a first circuit board connector is disposed between a first pair of lever arms and a second circuit board connector is disposed between a second pair of lever arms; and
   applying a force to the pivoting assembly in the direction approaching the main circuit board such that the force applied to the pivoting assembly is translated to a force applied by each lever arm in the direction away from the main circuit board to remove a docked expansion card.

18. The method of claim 17, further comprising:
   docking the expansion card in the main circuit board; and
   removing the expansion card from the main circuit board,
   wherein applying a force to the pivoting assembly in the direction approaching the main circuit board such that the force applied to the pivoting assembly is translated to a force applied by each lever arm in the direction away from the main circuit board to remove a docked expansion card includes pushing, by each lever arm, on the expansion card to disengage the respective plug connectors of the expansion card from each of the first circuit board connector and the second circuit board connector.

19. The method of claim 18, wherein the pivoting assembly is disposed on a surface of the main circuit board such that, when the expansion card is docked on the main circuit board, the pivoting assembly is situated between a surface of the expansion card and the surface of the main circuit board.

20. The method of claim 17, wherein the force provided by each lever arm is substantially parallel in direction and substantially perpendicular to the main circuit board.

* * * * *